June 25, 1957 H. E. THOMAS ET AL 2,797,341

SIGNAL SWITCHING DEVICE

Filed Oct. 2, 1953 2 Sheets-Sheet 1

INVENTORS
HARRY E. THOMAS
EMANUEL STEIN
BY Percy P. Lantzy
ATTORNEY

June 25, 1957 H. E. THOMAS ET AL 2,797,341

SIGNAL SWITCHING DEVICE

Filed Oct. 2, 1953 2 Sheets-Sheet 2

INVENTORS
HARRY E. THOMAS
EMANUEL STEIN
BY Percy P. Lantzy
ATTORNEY

United States Patent Office 2,797,341
Patented June 25, 1957

2,797,341

SIGNAL SWITCHING DEVICE

Harry E. Thomas, Montclair, and Emanuel Stein, Fairlawn, N. J., assignors to International Telephone and Telegraph Corporation, Nutley, N. J., a corporation of Maryland Application October 2, 1953, Serial No. 383,848

17 Claims. (Cl. 307—112)

Figure 1:
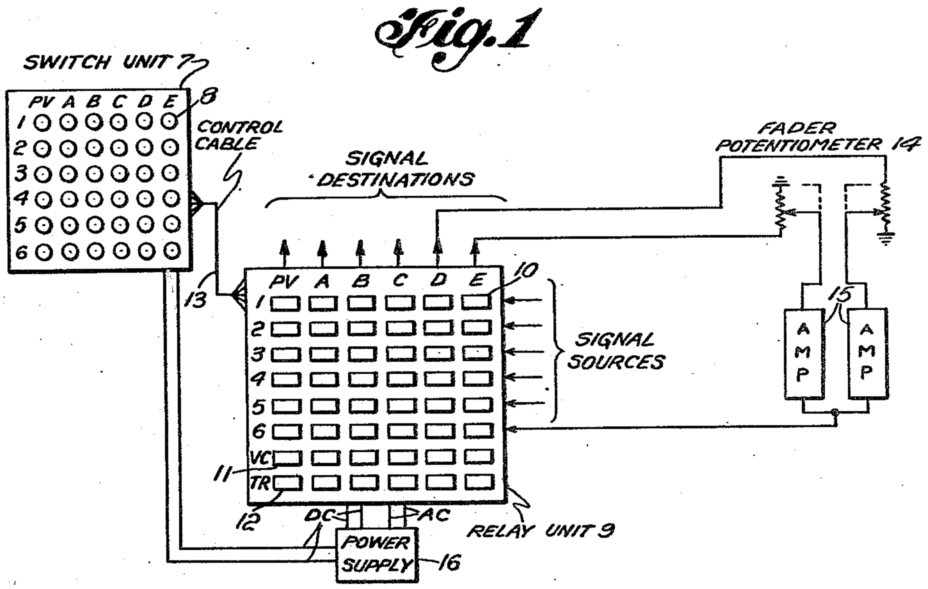

This invention relates to signal switching and more particularly to a television transmission, or the like, signal switching device.

The broadcast company originating a television program, whether the company is large or small, will find it necessary to switch video signals in some manner. This is necessitated by employing a number of cameras to gather program material which must be organized and ultimately coupled to a transmitter and/or network system. The program organization is accomplished by switching the signals from a plurality of cameras to one of a number of selected destinations upon an appropriate cue from the program director. This switching of a plurality of signal sources to a selected one of a plurality of destinations is possible by employing a switchboard capable of switching a selected signal to a selected destinations.

To provide the programming personnel with a versatile piece of equipment, the switchboard should provide gradual switching and abrupt switching. The gradual switching is needed for special effects, such as the lap dissolve and the fading of two signals, which may be manually accomplished by appropriate manipulation of back-to-back potentiometers associated with the input and output systems of two sources and automatically by employing variable time delay networks in the grids of a pair of mixer amplifiers. The abrupt switching of the gap type, "break-before-make," and the lap type, "make-before-break," and employed in television programming for rapid and convenient performance of multiple signal switching. The selection of lap or gap type of abrupt switching sequence is of considerable importance in smooth operation of the broadcast studio and any switchboard should have sufficient flexibility to allow for either type of abrupt switching in at least a portion of the composite switching system. Lap switching should be provided to maintain continuity of sweep and synchronizing conditions where local signals employng video signals linked to a common synchronizing generator source are being switched while gap switching should be provided to maintain receivers in synchronism where two independent synchronizing signals might be present in switching from a remote signal to a local signal where one signal is allowed to fade to black on the "break" portion prior to the "make" portion of the switching sequence. The fade interval, however, should not be over 10 milliseconds to enable synchronism to be re-established within one field.

Means for accomplishing abrupt switching may be classified under two general headings, namely, direct switching and indirect switching. The equipment coming under the former heading employ switches disposed directly in the video lines while the equipment coming under the latter heading employ switches which activate remotely located relays disposed adjacent the video lines.

The majority of the switchboards heretofore employed are of the direct switching type having mechanical interlocking pushbuttons which enjoys the advantage of compactness for local switching with short runs of video cables. These systems provide for connection of a maximum of six video signal sources to a maximum of three destinations. Where it is desirable to increase the capacity of such switchboards the control consoles have become too large to be located conveniently for the operator due mainly to the number of video coaxial cables involved. A further disadvantage is that the switching times to achieve lap and/or gap switching are not adjustable, complete interlock is not always mechanically convenient, and remote control is impossible.

In general, indirect switching systems will allow the main switching relays to be positioned extremely near video circuit terminations while the control or switching unit associated therewith may be located at a position in the studio setup dictated by convenience for the operator.

An object of this invention is the provision of an indirect signal switching system providing for quick and smooth coupling of an input circuit to an output circuit with a minimum of operations for any one switching cycle.

Another object of this invention is the provision of an indirect video switching system having versatility within the studio for employment as either a program director's console or in master control.

A further object of this invention is the provision of lap and gap switching within a signal switching system of the indirect type by predetermined adjustments of the switch blades and the contacts associated therewith for appropriate opening and closing sequences.

Still another object of this invention is the provision of automatic clearing means within a switching system of the indirect type to decouple all input circuit and output circuit from previously activated control units associated with the control unit being activated.

A feature of this invention is the provision of a plurality of control units incorporated within a D. C. potential operated indirect switching system, each of said control units including means to couple a selected input circuit to a given output circuit.

Another feature of this invention is the provision of a means to actuate selectively each of the plurality of control units of said D. C. potential operated indirect switching system, said means to actuate including a momentary contact switch having a plurality of switch blades, a pair of contacts adjacent each of said switch blades, said switch blades being normally in contact with one of said pair of contacts associated therewith, means to move said switch blades for actuation of said control units and initiation of the automatic clearing operation, and means to illuminate said means to move upon movement thereof.

Still another feature of this invention is the provision of means responsive to the actuation of the means to actuate selectively including a pair of relays coupled to those control units associated with the output circuits to cooperate in the automatic clearing operation prior to completing the coupling of a selected input circuit to a given output circuit.

Further features of this invention include termination connect or disconnect operation in the control units for those input circuits cleared and those input circuits switched, respectively. An operating potential source including A. C. voltage for illuminating a lamp in the means to actuate selectively a respective control unit. A double interlock system provided by connecting the operating voltage to a switch blade of said means to actuate selectively such that the vertical clearing action does not operate on gap switching unless the main actuating contacts are open, the vertical contact and main connects being common to the same switch blade. Adjustment of spacing between switch blades and associated contacts for setting sequences of closure and opening thereof to establish lap and gap switching.

Figure 2:
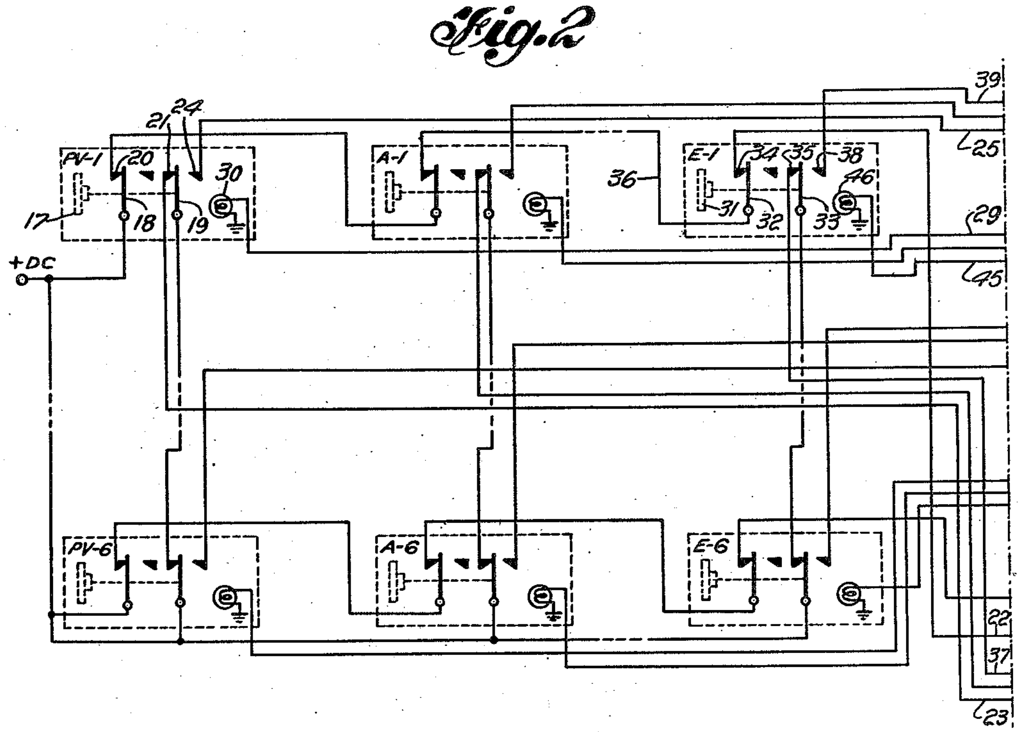
Figure 2A:
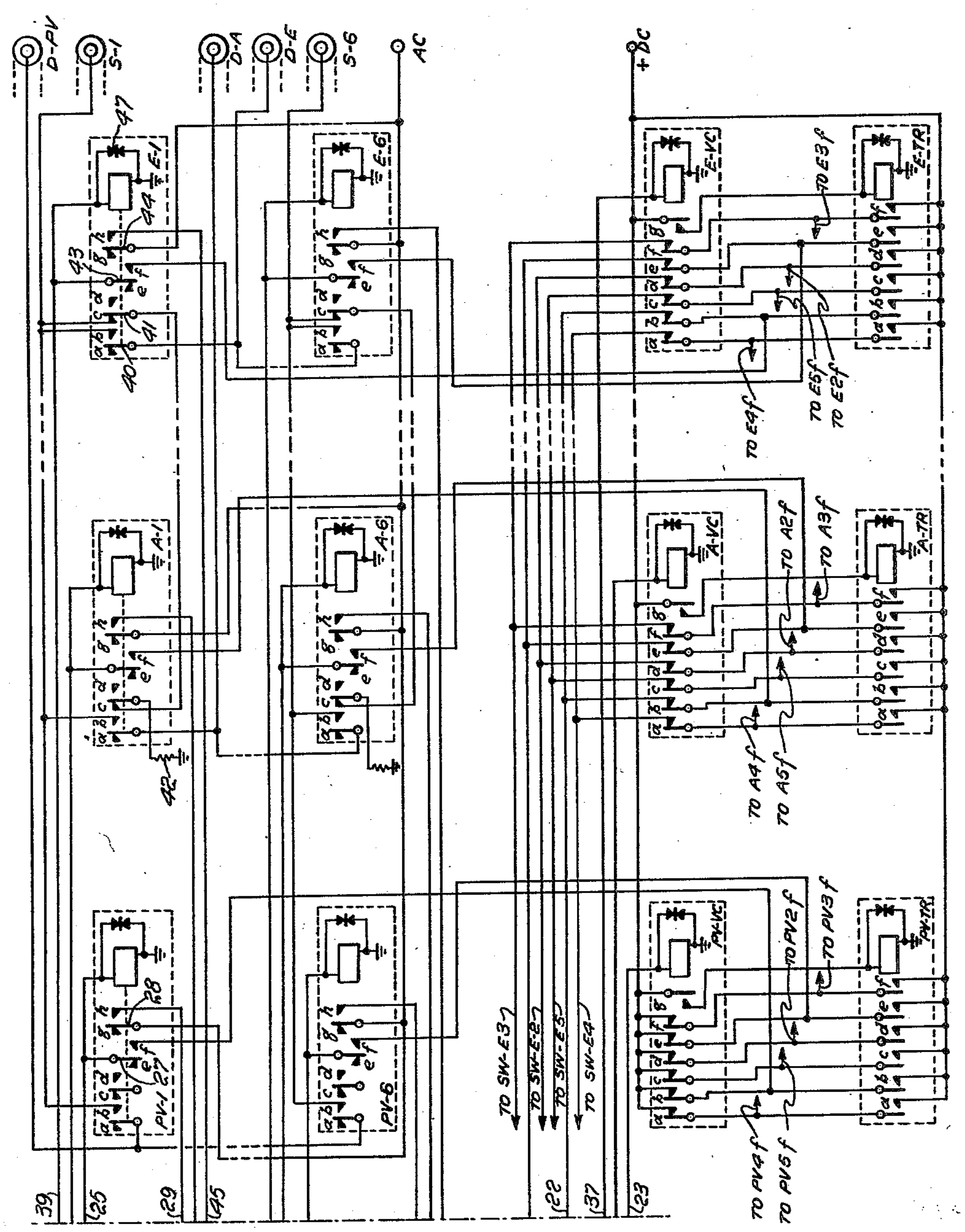

The above-mentioned and other features and objects of this invention will become more apparent by reference to the following description taken in conjunction with the accompanying drawings, in which:

Fig. 1 is a block diagram of the signal switching device in accordance with the principles of this invention; and Figs. 2 and 2A illustrate for purposes of explanation certain ones of the switches and associated relays illustrated diagrammatically in Fig. 1.

Referring to Fig. 1, there is illustrated diagrammatically a switching device following the principle of this invention comprising a switch unit 7 including a plurality of identical momentary contact pushbutton switches 8, a relay unit 9 including a plurality of control or main switching relays 10, a plurality of clearing relays 11 and transfer relays 12 associated with each one of the destinations or output circuits for cooperation in accomplishing automatic clearing. The arrangement of switch unit 7 and relay unit 9 is an indirect switching system arranged to be mounted in a single console, but includes means whereby the relays may be remotely located from the switching unit 7 so that the pushbutton switch panel may be placed in the most convenient location. Switch unit 7 and relay unit 9 are interconnected by a control cable 13 which may be any desired length depending upon the location of relay unit 9, whether in the console or at a remote location. The signal switching device of this invention is capable of being expanded from the six input-six output system, illustrated, to a six input-twelve output system by adding switch and relay units similar to units 7 and 9 in a tandem relationship. A fader control potentiometer 14 mounted conveniently on the console may be interconnected to the main switching system through mixer amplifiers 15 to make available the various types of gradual transitions. Relay power for actuating the solenoids thereof is supplied from a 28 volt self-contained power supply 16 which includes a 6.3 A. C. output for illumination of the pushbuttons incorporated in unit 7.

The arrangement for interconnection of the system illustrated in Fig. 1 is such that the actuation of any one pushbutton on unit 7 will perform the following functions; input and output circuits will be automatically cleared; that is, all sources or signal destinations connected with the pushbutton under operation, other than the connection to be made, will be automatically disconnected. For instance, if the signal source or input circuits are arranged as indicated by the references 1–6 on unit 7, and the destinations or output circuits are arranged as indicated by the letters PV, A, B, C, D, E in unit 7, the pushing of any one of the indicated buttons should clear the vertical column or output circuit, and also the horizontal row or input circuit in which the selected pushbutton is disposed. In the past clearing has been accomplished by a separate operation, but in many cases, particularly during a program, such loss of time is annoying and the automatic clearing system incorporated in this invention is a distinct advantage.

Where two outputs are connected to one input the feature of automatic destination clearing, or vertical clearing, may be objectionable. However, this objection is overcome by the provision of extra input facilities; for instance, when two outputs from the same input are desired, duplicate inputs are usually supplied through amplifiers 15 and these two sources punched up; that is, switched to the two desired destinations. In this manner, either common input can be switched independently of the other with no interference encountered from vertical clearing.

After the automatic clearing operation has been performed, the relay actuated by its corresponding switch should complete the desired video switching, that is, connect a selected source to a desired destination, the central action of the complete system. The active or main switching relay should also apply power to illuminate the actuated switch. The sources disconnected by the clearing action should be automatically terminated by the switching relay and the source connected to the desired destination should be disconnected from its termination to remove any possibility of doubly terminating the signal source, double termination meaning the termination supplied by the switching arrangement and the termination of the destination. Releasing the actuated pushbutton switch should keep the system functioning, or switched to the above desired set of conditions, but in readiness to start the complete switching cycle over again. This interlocking arrangement is provided by one of the plurality of contacts included in each of the main switching relays.

In the signal switching system herein disclosed, lap and/or gap switching sequences are provided by adjusting the switch contact separation rather than adjusting the relay contacts. This means of adjusting operating sequence is much easier and simpler than attempting to adjust the time of spacing of the relay contacts. A lap of several milliseconds can be obtained and gaps of any time between 0 and 20 milliseconds are possible by merely adjusting the spacing between manual switch blade contacts. In other words, the time of relay contact opening on the disconnect or clearing portion of the switching cycle cancels the time of contact relay travel on the closing or actuating portion of the cycle so that the only time consumed in a single switching operation is the time of travel of one switch contact to another.

Although the relay contacts on video sources and destinations are in parallel and thereby add capacitance to ground, the independent relays are physically in close spaced relation with sufficiently low capacitance to ground that the transmission line discontinuity is negligible with the cross talk between lines extremely low.

Referring to Figs. 2 and 2A, certain ones of the switches and relays of the units 7 and 9, respectively, are illustrated in schematic form for detailed description of the operation of the signal switching system of this invention. For the purpose of this description it will be assumed that the equipment has just been turned on and that the switches and the relays as shown are in that condition which will enable the desired connection of a selected signal source to a given signal destination. It will be observed that the switches, the main switching relays, and the transfer relays are in an unactivated condition and the clearing relays are in an actvated condition, these being the conditions of the various relays and switches prior to commencing a switching operation.

For purposes of identifying a particular one of the plurality of switches in unit 7 and a corresponding one of the plurality of relays in unit 9 the following reference system will hereinafter be employed. The destination letter and input number will be combined to provide the reference character for both the switches and the relays. For instance, the pushbutton switch 8 will hereinafter be referred to as switch E–1, indicating that source 1 is being connected to destination E by actuation of switch E–1. The actuation of switch E–1 causes the corresponding relay, relay E–1 (relay 10), to become energized to couple the input circuit to the output circuit. The vertical clearing relays and the transfer relays will likewise be hereinafter referred to as VC plus the capital letter referring to the destination under consideration and as TR plus the destination under consideration, respectively. For instance, the vertical clearing relay 11 will hereinafter be referred to as VC–PV while the transfer relay 12 will be referred to as TR–PV.

The operation of the switching device of this invention is best described by giving the step-by-step operation of the switching cycle, with reference to Figs. 2 and 2A, wherein a selected signal source is connected to a given signal destination including the automatic clearing operation which is performed through the cooperative arrangement of the relays and switches. Let us assume that it is desired to obtain a preview of signal coupled to input circuit 1 prior to transferring this signal to the transmitter which we will assume, in this example, to be destination E. The operator will momentarily press the pushbutton 17 of switch PV–1 such that switch blades 18 and 19 break contact with contacts 20 and 21, the sequence of operation and time consumed being adjusted by bending the contacts a predetermined amount. Contact 20 is termed the horizontal clearing contact and acts to open the D. C. supply traveling horizontally through each of the relays associated with input circuit 1. This operating potential is applied from terminal 22 to given contacts of each of the vertical clearing relays associated with the signal destinations other than the preview destination. It is the action of breaking contact 20 that initiates the horizontal clearing action of the automatic clearing system.

The breaking of contact 21 opens the D. C. line interconnecting the identical switch contacts in a particular destination column, in this example, the preview destination. The operating potential is connected through terminal 23 and the control cable 13 to the solenoid of relay PV–VC. By opening or breaking the contact between contact 21 and switch blade 19 energizing current is removed from the solenoid of relay PV–VC causing the contacts *a–f* thereof to be placed in the opened condition and causes contact *g* of relay PV–VC to assume a closed position. The action of closing contact *g* of relay PV–VC applies a D. C. energizing current to the solenoid of relay PV–TR. The breaking of contacts *a–f* of relay PV–VC disconnects the D. C. potential from contacts *f* of all the preview relays. Contact *f* and the potential associated therewith maintains any relay actuated by a pushbutton to be maintained in the actuation condition until another pushbutton in that column is actuated for switching another signal source for a preview. Thus, the opening of contacts *a–f* of relay PV–VC clears previously actuated preview relays prior to accomplishing the present desired transition.

Besides opening the switch contacts outlined hereinabove by pressing button 17, the switch blade 19 makes contact with contact 24 which applies a D. C. voltage through contact 24 to terminal 25 for energizing the solenoid of relay PV–1. The energizing of the solenoid of PV–1 causes armature 26 to be placed in contact with contact *b* which connects input circuit 1 to output circuit PV, the main action of the switching system. Simultaneously armature 27 makes contact with contact *f* the holding contact for relay PV–1. Contact *f* of PV–1 is connected to contact *b* of PV–VC and likewise contact *b* of PV–TR. As mentioned hereinabove the pushing of button 17 de-energizes the solenoid of relay PV–VC removing the D. C. voltage for clearing purposes from contact *f* of all the relays in a vertical column and at the same time energizes the solenoid of PV–TR causing contacts *a–f* to close thereby applying a D. C. potential to all of the contacts *f* of the relays located in the vertical columns. The application of this D. C. voltage as applied to the relay actuated by its corresponding pushbutton applies a holding voltage to the solenoid thereof. Armature 28 of relay PV–1 is caused to make contact with contact *h* which applies an A. C. voltage along line 29 to lamp 30 of switch PV–1 for illumination of the pushbutton 17.

Having now made the desired switching operation the momentary actuation of pushbutton 17 may be released causing the contacts in the switch to be returned to their normal poistion as illustrated in Fig. 2. This causes the solenoid of PV–VC to again become energized applying a D. C. potential through the contacts thereof to the contacts *f* of the main switching relays and at the same time to de-energize relay PV–TR in the sequence set forth in this description such that the solenoid originally activated by the pushbutton will have maintained thereacross a D. C. energizing voltage causing that relay to remain in the energized position until such time as another pushbutton in its row or in its column is actuated to start a new switching operation.

Having previewed the signal of source 1 it is now desired to switch source 1 to destination E which is accomplished by depressing pushbutton 31 which causes switch blades 32 and 33 to break contact respectively with contacts 34 and 35 thereby starting the necessary clearing action automatically in the following manner. The movement of switch blade 32 from contact 34, the horizontal clearing contact, opens up the D. C. potential line 36 such that there is no D. C. potential applied along line 22. Line 22 is connected to the holding circuit of each horizontal relay A–1 throught E–1 by means of contact *b* in the clearing relays A–VC through E–VC. Thus, the removal of the D. C. potential from line 22 by depressing pushbutton 31 removes the operating potential from contact *f* of the relays A–1 through E–1 thereby de-energizing the solenoids of those respective relays that may have been energized in a previous switching cycle returning such a relay to its unenergized condition. This action then completes the horizontal clearing action of the switching cycle on the main switching relays A–1 to E–1. It is to be noticed, however, that the preview relay is not effected by this clearing action since it is usually desirable to monitor or preview the source at all times while being sent to a predetermined destination.

Having run through the horizontal clearing action, the reader's attention is returnned to switch E–1 wherein switch blade 33 is removed from contact 35, the vertical clearing contact, by action of button 31. This action removes the vertical D. C. potential from contact 35 and thus from line 37 which removes the energizing current from the solenoid of relay E–VC. As a result of the breaking of the contact between contact 35 and switch blade 33, contacts *a–f* of relay E–VC are opened and contact *g* of relay E–VC is closed. The action of opening contacts *a–f* is to remove the holding current from the holding circuits of the relays disposed in the vertical columns, namely, relays E–1 through E–6, in this example, and thereby de-energize the solenoids of any relay previously activated. This action essentially completes the vertical clearing of this equipment. However, some means must be provided to enable the activation of the holding circuit of that main switching relay activated. This is accomplished by the transfer relay E–TR. The closing of contact *g* applies a D. C. potential to the solenoid of relay E–TR causing energizing thereof and the closing of contacts *a–f*. This action applies a D. C. potential to contact *f* of the relays arranged in the vertical column of the selected destination. The D. C. potential thereby applied will have no effect on any of the relays except the relay actuated by the pushbutton switch. This potential on contact *f* of the selected relay will provide a holding current on the respective solenoid until the relay E–VC is returned to its normally energized position which occurs when pushbutton 31 returns to its normal position.

However, prior to applying the holding current to the solenoid of the selected relay it is necessary to provide activation of the main switching relay. In the example presented herein pushbutton 31 after breaking the contact between switch blade 33 and contact 35 causes switch blade 33 to make contact with contact 38, the main switching contact. Switch blade 33 having applied to it the operating D. C. potential causes the conduction of energizing current along line 39 to the solenoid of relay E–1 which is thereby energized. This action brings about four operations as follows.

Armature 40 is caused to make contact with contact *b* which performs the desired operation of switching the input circuit 1 to the selected output circuit E. At the same time armature 41 is caused to move from contact *c* to contact *d* thereby removing the termination of circuit 1 provided by resistor 42, eliminating a possible double termination of the input circuit 1. Armature 43 makes contact with contact *f* which as herebefore set forth has a D. C. potential applied hereto from contact *b* of energized relay E–TR. This D. C. potential at contact $f$ initiates the operation of the holding circuit of relay E–1 when switch 31 is returned to its normal position after its momentary contact. Armature 44 makes contact with contact $h$ which applies from the operating potential source an A. C. potential, say 6.3 volts A. C., along line 45 to the lamp 46 which illuminates the activated pushbutton.

To complete the switching cycle, pushbutton 31 returns to its original position ready for a new switching cycle. In doing this, switch blade 33 of switch 31 breaks contact with the main switching contact 38, but the relay E–1 is maintained in its energized position by action of the holding circuit including contact $f$ of the activated relay. The current for this holding action during this interval is supplied by relay E–TR through contact $b$. Switch blade 33 of switch E–1 makes contact with contact 35 which provides energizing current to travel along line 37 to energize the solenoid of relay E–VC. Switch blade 32 of switch E–1 is returned to make contact with contact 34 such that D. C. operating potential is again applied along line 22 to contact $b$ of relay E–VC. Thus, the re-energizing of relay E–VC causes relay E–TR to become de-energized removing D. C. potential from contact $f$ of relay E–1, but which is replaced by the D. C. potential from contact $b$ of relay E–VC thereby maintaining the holding current on the solenoid of relay E–1 until such time that the automatic clearing action may release the solenoid on a subsequent switching cycle.

Having now traced through two switching cycles to illustrate the automatic clearing operation and the ability of maintaining a preview of a signal coming from a signal source when and after said signal is switched to a selected signal destination, it should be remembered that the clearing and transfer relay system have a sequence of closure and opening which makes the setting of lap and gap switching purely a function of the spacing between manual switch blade contacts and thereby eliminates the necessity of relay contact adjustment, a specialized operation.

The switching system of this invention is provided with a double interlock arrangement that gives assurance that vertical clearing action does not operate on gap switching unless the main actuating contacts, such as contact 38 of switch E–1, are open. This advantage is achieved by making the switch blade 33 of the vertical clearing and main switching section carry the main actuating potential. This means that when the switch blade is in the main actuating position vertical clearing must be in effect together with the transfer function. Further, the horizontal and vertical disconnect or clearing actions are initiated by separate switch blades thereby providing separate gap or lap adjustments of these blades. This is particularly valuable when adjusting operating sequences or when relay operation is not uniform. Furthermore, each one of the relay solenoids of this system are provided with a bock-to-back selenium rectifier device, such as device 47, shunting the solenoid of relay E–1. These rectifier devices function as a damping device to substantially eliminate any adverse effect in the switching cycle from contact sparking in the actuated relays.

While the description of this invention has been carried forward with reference to a basic unit capable of switching any one of six signal sources to selected ones of six destinations, the arrangement of separate integrated pairs of switching sections enables pairs of vertical switch rows and pairs of switching relays, along with their accompanying clearing and transfer relays, to be added to the basic unit for increasing the possibilities of destinations to which the six sources may be switched, the operation thereof being identical to the above description.

While we have described above the principles of our invention in connection with specific apparatus, it is to be clearly understood that this description is made only by way of example and not as a limitation to the scope of our invention as set forth in the objects thereof and in the accompanying claims.

We claim:

1. A signal switching device comprising a plurality of control units, a plurality of signal input circuits, one of said input circuits being operably associated with certain of said control units and other of said input circuits being operably associated with certain others of said control units, a plurality of output circuits, one of said output circuits being operably associated with certain of said control units and other of said output circuits being operably associated with certain others of said control units, means to actuate selectively said control units to couple the respective input circuit associated therewith to the respective output circuit associated therewith, said control units each having associated therewith means responsive to actuation thereof to decouple those control units associated with the same input and output circuits with which the actuated control unit is associated, said means to actuate selectively comprising a source of operating potential and a plurality of selecting devices, one of said selecting devices being associated with each of said control units and said source of operating potential, each of said selecting devices including means to initiate the operation of said means responsive to actuation and said control unit sequentially.

2. A device according to claim 1, wherein each of said selecting devices includes a momentary contact switch having a plurality of switch blades, a pair of contacts adjacent each of said switch blades, said switch blades being normally in contact with one of said pair of contacts associated therewith, means to move said switch blades for breaking contact between said one of said pair of contacts and for making contact with the other one of said pair of contacts, and means to illuminate said means to move upon movement thereof.

3. A device according to claim 2, wherein said means to initiate comprises a first series circuit connection including certain of said one of said pair of contacts and its associated switch blade in each of said selecting devices associated with one of said input circuits, said source of operating potential and said means responsive to actuation and a second series circuit connection including other of said one of said pair of contacts and its associated switch blade in each of said selecting devices associated with one of said output circuits, said source of operating potential and said means responsive to actuation whereby the movement of said means to move interrupts the flow of current from said source of operating potential to initiate the operation of said means responsive to actuation.

4. A device according to claim 3, wherein said means responsive includes a first relay normally energized having a solenoid, a given number of contacts, and switching armatures operable by said solenoid, associated with each of said contacts, means coupling all except one of said contacts to respective ones of said first series circuit connection, means coupling said solenoid to respective ones of said second series circuit connection, a second relay normally unenergized having a solenoid, a given number of contacts, and switching armatures operable by said solenoid, associated with each of said contacts, means coupling all except one of the armatures of said first relay to the contacts of said second relay, means coupling the solenoid of said second relay to one of the contacts of said first relay, means coupling one of said armatures of said first relay to said source of operating potential for energizing said second relay upon de-energizing said first relay through said second series circuit connection, means coupling the contacts of said second relay to said source of operating potential, and means connecting the armatures of said second relay to given ones of said control units associated with one of said output circuits.

5. A device according to claim 2, wherein said means to initiate further comprises a third series circuit connection including certain of said other of said pair of contacts and the switch blade adjacent thereto in each of said selecting devices associated with one of said output circuits, said source of operating potential and respective ones of said control units whereby the movement of said means to move applies the flow of current from said source of operating potential to actuate the operation of the selected one of said control unit.

6. A device according to claim 5, wherein each of said control units includes a relay normally unenergized having a solenoid, a given number of contacts, and switching armatures operable by said solenoid, associated with each of said contacts, termination means, means, including a first one of said switching armatures and a contact associated therewith, to couple said termination means to said input circuit when said relay is in its normal condition, means, including a second one of said switching armatures and a contact associated therewith, to couple said input circuit to said output circuit upon energizing said relay, means, including a third one of said switching armatures and a contact associated therewith, to couple said source of operating potential to said solenoid to maintain said relay, in an energized condition upon activation thereof, means, including another one of said switching armatures and an associated contact, to couple said source of operating potential to said means to illuminate for illumination thereof upon activation of said relay, and damping means shunting said solenoid to reduce the adverse effect of contact sparking within said relay.

7. A device according to claim 6, wherein said damping means includes a back-to-back selenium rectifier in parallel relation to said solenoid.

8. A device according to claim 6, wherein said source of operating potential includes a source of D. C. voltage for operation of said control unit, means to actuate selectively and said means responsive to actuation and a source of A. C. voltage for illumination of said means to illuminate.

9. A signal switching device comprising a plurality of control units, a plurality of signal input circuits, one of said input circuits being operably associated with certain of said control units and other of said input circuits being operably associated with certain others of said control units, a plurality of output circuits, one of said output circuits being operably associated with certain of said control units and other of said output circuits being operably associated with certain others of said control units, means to actuate selectively said control units to couple the respective input circuit associated therewith to the respective output circuit associated therewith, said control units each having associated therewith means responsive to actuation thereof to decouple those control units associated with the same input and output circuits with which the actuated control unit is associated, and a source of operating potential, means, included in said means to actuate selectively, to apply the potential of said source to the selected one of said control units for activation thereof, and means, included in said means responsive to actuation, to remove the potential of said source from each of those control units previously actuated associated with the input and output circuits involved in a switching operation.

10. A device according to claim 9, wherein each of said control units includes a relay normally unenergized having a solenoid, a given number of contacts, and switching armatures associated with each of said contacts operable by said solenoid, termination means, means, including a first one of said switching armatures and a contact associated therewith, to couple said termination means to said input circuit when said relay is in its normal condition, means, including a second one of said switching armatures and a contact associated therewith, to couple said input circuit to said output circuit upon energizing said relay, and means, including a third one of said switching armatures and a contact associated therewith, to couple said source of operating potential to said solenoid to maintain said solenoid in an energized condition upon activation thereof.

11. A device according to claim 10, further including a momentary contact pushbutton switch and means for illumination thereof, said pushbutton switch having a plurality of switch blades, a pair of contacts adjacent each of said switch blades, said switch blades being normally in contact with one of said pair of contacts, means to break the last mentioned connection to remove the potential of said source from each of those control units previously actuated associated with the input and output circuits of the actuated control unit, and means to make contact between said switch blades and the other one of said pair of contacts to apply the potential of said source to the associated one of said control units, and means, including a fourth one of said switching armatures and a contact associated therewith in said control unit, to couple said source of operating potential to said means for illumination to illuminate the activated one of said pushbutton switches.

12. A signal switching device comprising a plurality of control units, a plurality of signal input circuits, each of said control units being associated with a different one of said input circuits, an output circuit common to all said control units, each of said control units including a relay normally unenergized having a solenoid, a given number of contacts, and switching armatures activated by said solenoid associated with each of said contacts, termination means, a source of operating potential, means, including a first one of said switching armatures, to couple said termination means to said input circuit when said relay is in its normal condition, means, including a second one of said switching armatures, to couple the associated one of said input circuits to said common output circuit upon energizing said relay, means, including a third one of said switching armatures, to couple said source of operating potential to said solenoid to maintain said solenoid in an energized condition upon activation thereof, means to illuminate the activated one of said control units, means, including a fourth one of said switching armatures, to couple said source of operating potential to said means to illuminate for illumination of said activated control unit upon activation of said relay, damping means shunting said solenoid to reduce the adverse effect of contacts sparking within said relay, actuating means to actuate selectively said control units to initiate the coupling of a selected input circuit to said common output circuit, each of said control units including means responsive to activation thereof to decouple any of the other of said control units that had been previously actuated.

13. A signal switching device comprising a plurality of control units, a plurality of signal input circuits, each of said control units being associated with a different one of said input circuits, an output circuit common to all said control units, actuating means to actuate selectively said control units to couple a selected input circuit to said output circuit, each of said control units having associated therewith means responsive to actuation thereof to decouple any of the other of said control units that had been previously actuated, said means to actuate selectively comprising a source of operating potential and a plurality of selecting devices, each of said selecting devices being associated with one of said control units and said source of operating potential, each of said selecting devices including means to initiate operation of said means responsive to actuation and said control unit sequentially.

14. A signal switching device comprising a plurality of control units, a plurality of signal input circuits, each of said control units being associated with a different one of said input circuits, an output circuit common to all said control units, actuating means to actuate selectively said control units to couple a selected input circuit to said output circuit and means responsive to actuation of said control units included in each of said control units to decouple any of the other of said control units that had been previously actuated, said means responsive to actuation including a first relay normally energized having a solenoid, a given number of contacts, and switching armatures operable by said solenoid associated with each of said contacts, means coupling all except one of said contacts to respective one of said means to actuate selectively, means coupling said solenoid to respective ones of said means to actuate selectively, a second relay normally unenergized having a solenoid, a given number of contacts, and a switching armature operable by said solenoid associated with each of said contacts, means coupling all except one of the armatures of said first relay to the contacts of said second relay, means coupling the solenoid of said second relay to one of the contacts of said first relay, a source of operating potential, means coupling one of said armatures of said first relay to said source of operating potential for energizing said second relay upon de-energizing said first relay, means coupling the contacts of said second relay to said source of operating potential, and means coupling the armature of said second relay to each of said control units associated with said common output circuit.

15. A signal switching device comprising a plurality of control units, an input circuit common to all said control units, a plurality of output circuits each associated with a different one of said control units, means to actuate selectively said control units to couple said input circuit to the output circuit associated with the actuated control unit, said control units each having associated therewith means responsive to actuation thereof to decouple any of the other of said control units that had been previously actuated, said control units including a relay normally unenergized having a solenoid, a given number of contacts, and a switching armature operable by said solenoid associated with each of said contacts, termination means, a source of operating potential, means to illuminate the actuated control unit, means, including a first one of said switching armatures, to couple said termination means to said input circuit when said relay is in its normal condition, means, including a second one of said switching armatures, to couple said input circuit to said output circuit upon actuating said relay, means, including a third one of said switching armature, to couple said source of operating potential to said solenoid to maintain said relay in an energized condition upon activation thereof, means, including a fourth one of said switching armature, to couple said source of operating potential to said means to illuminate, and damping means shunting said solenoid to reduce the adverse effect of contact sparking within said relay.

16. A signal switching device comprising a plurality of control units, an input circuit common to all said control units, a plurality of output circuits each associated with a different one of said control units, means to actuate selectively said conrol units to couple said input circuit to the output circuit associted with the actuated control unit, said control units each having associated therewith means responsive to actuation thereof to decouple any of the other of said control units that had been previously acuated, said means to actuate selectively comprising a source of operating potential and a plurality of selecting devices, each of said selecting devices being associated with one of said control units and said source of operating potential, each of said selecting devices including means to initiate the operation of said means responsive to actuation and said control unit sequentially.

17. A signal switching device comprising a plurality of control units, an input circuit common to all said control units, a plurality of output circuits each associated with a different one of said control units, means to actuate selectively said control units to couple said input circuit to the output circuit associated with the actuated control unit, said control units each having associated therewith means responsive to actuation thereof to decouple any of the other of said control units that had been previously actuated, said means responsive including a normally energized relay for a solenoid, a given number of contacts, and a switching armature operable by said solenoid associated with each of said contacts, means coupling all except one of said contacts to respective ones of said means to actuate selectively, means coupling said solenoid to respective ones of said means to actuate selectively, a normally unenergized relay having a solenoid, a given number of contacts, and switching armatures operable by said solenoid associated with each of said contacts, means coupling all except one of the armatures of said normally energized relay to the contacts of said normally unenergized relay, means coupling the solenoid of said normally unenergized relay to one of the contacts of said first relay, a source of operating potential, means coupling one of said armatures of said normally energized relay to said source of operating potential for energizing said normally unenergized relay upon de-energizing said energized relay, means coupling the contacts of said unenergized relay to said source of operating potential, and means connecting the armatures of said unenergized relay to given ones of said control units associated with given ones of said output circuits.

References Cited in the file of this patent

UNITED STATES PATENTS

| | | |
|---|---|---|
| 2,014,221 | Baumfalk | Sept. 10, 1935 |
| 2,445,820 | Bloomberg et al. | July 27, 1948 |
| 2,491,808 | Tyler | Dec. 20, 1949 |
| 2,531,187 | Yardeny et al. | Nov. 21, 1950 |